Inventor:—
August L. Streater,
By Hibben, Noyes & Bicknell Attys.

Sept. 16, 1969      A. L. STREATER      3,467,903

MOTOR WITH THERMAL CUTOUT

Filed Oct. 14, 1966      2 Sheets-Sheet 2

Inventor:-
August L. Streater,
By Hibben, Noyes & Bicknell
Attys.

United States Patent Office 3,467,903
Patented Sept. 16, 1969

3,467,903
MOTOR WITH THERMAL CUTOUT
August L. Streater, Wells County, Ind., assignor to Franklin Electric Co., Inc., Bluffton, Ind., a corporation of Indiana
Filed Oct. 14, 1966, Ser. No. 586,763
Int. Cl. H02p 5/28, 1/16; H02k 17/00
U.S. Cl. 318—221                                        12 Claims

ABSTRACT OF THE DISCLOSURE

A thermal relay for an induction motor which removes the start winding from energization circuit. Means are provided to bypass a portion of the current flowing through the running winding during startup conditions when excessive current is drawn while during running conditions, when relatively low current flows, substantially all the current flowing through the running winding flows through the thermal element.

---

This invention relates to electric motors, and more particularly to an electric motor including a thermal cutout.

Certain types of single phase alternating current electric motors are constructed with a running winding and a starting winding, the starting winding being constructed to be energized normally only during startup conditions. Various types of switching devices have been provided to connect the starting winding to the power lines during startup conditions and to disconnect the starting winding after the motor has reached a predetermined speed or has been in operation for a certain length of time. For example, centrifugally actuated switches have been connected to the rotor shaft to sense the speed of the motor and to actuate a switch for the purpose of disconnecting the starting winding after the motor has reached a predetermined speed. Another switch has also been used comprising a thermally actuated switch which is connected to disconnect the starting winding after a time delay which is dependent upon the amount of current flowing through the running winding of the motor. In a typical installation of the latter type, the thermal relay includes a bimetal element which is connected in series with the main motor winding and relay contacts which are connected to be actuated through a mechanical connection with the bimetal element. After a predetermined amount of heating due to current flowing through the series connection of the bimetal element and the main winding, the bimetal element deflects sufficiently to disconnect the starting winding which is connected to be energized through the relay contacts.

While the thermal relay type of cutout described above has advantages in that it is inexpensive and simple, some difficulties have been met in designing such a thermal relay which will operate satisfactorily under all operating conditions of the motor. For example, the length of time required for the bimetal element to open the relay contacts and thereby disconnect the starting windings during the startup conditions is determined largely by the thermal capacity of the bimetal element, its electrical resistance, and the heat losses from the thermal relay due to radiation, conduction and convection. The thermal relay should be constructed with these factors in mind so that the contacts open to disconnect the starting windings after the motor has reached a predetermined percentage of running speed without too great a variation one way or the other, and normally this requires a thermal relay with a relatively large heat capacity and low electrical resistance. However, under running conditions the construction of the thermal relay should be such that the relay contacts for the starting winding are maintained open. Thus, even under light load running conditions of the motor, wherein a relatively small amount of current is required, the bimetal element should have a sufficiently high electrical resistance that the relay contacts will remain open. This of course is contrary to the requirements for the thermal relay during startup conditions. Another complicating factor requiring a thermal relay having a relatively low thermal capacity is that the motor should have a relatively short "reset interval." Immediately after a motor has been deenergized, the bimetal element is still heated, and a predetermined length of time is required for the bimetal element to cool sufficiently to permit the contacts for the starting winding to close again, which is required before the motor may be restarted. Therefore, to have a relatively short reset interval, the thermal capacity of the relay should be relatively low. This again is contrary to the conditions for startup.

Accordingly, it is a primary object of this invention to provide an electric motor including a thermal relay cutout which does not have the foregoing objections.

It is another object of this invention to provide a motor including a thermal relay cutout of the foregoing character, which is relatively simple, inexpensive and reliable.

Still another object is to provide a thermal relay cutout of the foregoing character, which normally disconnects the starting winding but on excessive current flowing through the running winding the thermal relay cutout is bypassed.

Other objects and advantages of the invention will become apparent from the following description taken in conjunction with the accompanying figures of the drawings, in which.

In general, a motor including a thermal relay embodying the invention comprises starting and running windings which are adapted to be energized by a pair of alternating current carrying power lines, one side of each of the motor windings being connected to one of the power lines. The thermal relay includes a thermal element, at least one stationary relay contact, and a movable contact actuatable by the thermal element to a first position to where it engages the one stationary contact, and to a second position where it is out of engagement with the one stationary contact. The movable contact and one side of the thermal element are connected to the other power line, the other side of the thermal element is connected to the running winding, and the one stationary contact is connected to the starting winding. In addition, means is connected to the thermal element for shunting a portion of the current normally flowing through the thermal element around the thermal element during high current flow operating conditions of the motor. The shunting means is responsive to the amount of current flowing through the thermal element, and when the current flowing through the thermal element tends to be relatively large, a relatively large percentage of this current is shunted around the thermal element. On the other hand, when the amount of current flowing through the thermal element is relatively small, little or no current is shunted around the thermal element. Consequently, during high current startup conditions of the electric motor, a relatively large percentage of the running winding current is shunted around the thermal element producing the effect of a thermal relay having a relatively low electrical resistance. During motor running operating conditions with the starting winding disconnected and a relatively small amount of current flowing through the running winding, a relatively small amount or no current is shunted around the thermal element, causing all of the main winding current to flow through the thermal element and giving the effect of a thermal relay having a relatively high electrical resistance. Further, since the thermal relay may be constructed with a relatively low thermal capacity due to the shunting means, the thermal relay will cool relatively rapidly and, consequently, have a relatively short reset interval.

The thermal relay may be provided with a second stationary contact connected to the side of the bimetallic element which is also connected to the running winding. With this arrangement, the bimetallic element and the shunting means may be bypassed when the bimetallic element is heated above that necessary to disconnect the starting winding.

Figure 1:
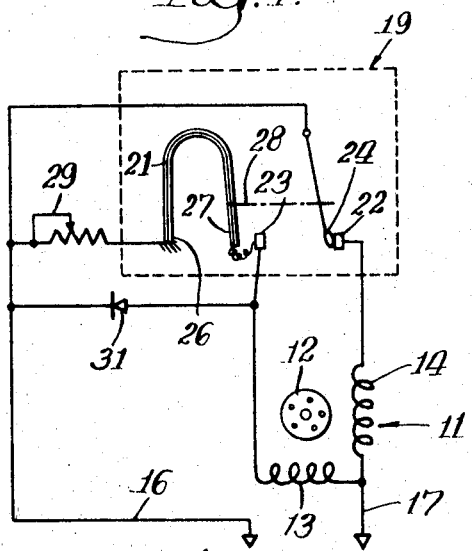
FIG. 1 is a schematic illustration of an electric motor including a thermal relay cutout embodying the invention.
Figure 2:
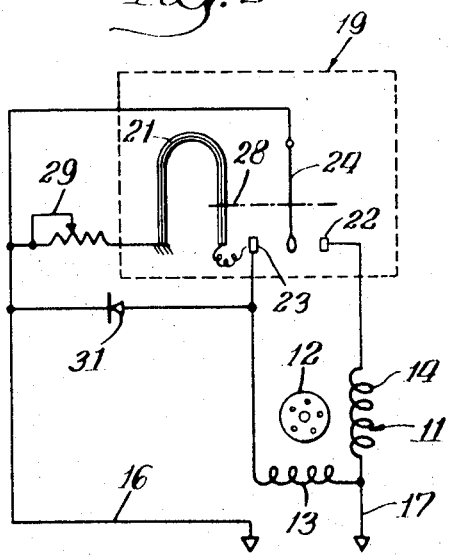
FIGS. 2 and 3 show schematic illustrations of the circuit of FIG. 1 under different operating conditions.
Figure 3:
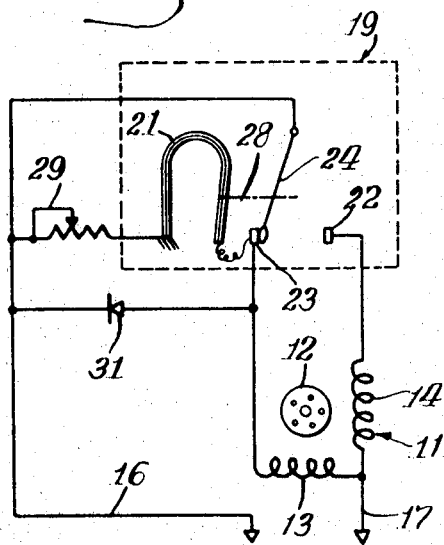

In greater detail, FIGS. 1 through 3 show an electric motor 11 including a rotor 12, a main or running winding 13, and a starting winding 14. Two power lines 16 and 17 are adapted to connect the apparatus to a source of alternating single phase current, the power line 17 being connected to one side of both the running winding 13 and the starting winding 14.

The apparatus further includes a thermal relay 19 including a heat sensitive or thermal element such as a bimetal element 21, a stationary contact 22 and a movable contact 24. The thermal relay 19 may also have another stationary contact 23 for a purpose to be described hereinafter. In the present construction, one end 26 of the bimetal element 21 is fixed in place while its other end 27 is free to move and is mechanically connected through a suitable linkage 28 to the movable contact 24 of the relay. When the bimetal element 21 is relatively cool, the movable contact 24 makes electrical engagement with stationary contact 22, and when the element 21 is sufficiently heated the element 21 and the movable contact 24 deflect to cause the movable contact 24 to move into engagement with the other stationary contact 23. Further, there is an additional position of the movable contact 24 wherein it is intermediate the stationary contacts 22 and 23 and consequently does not make electrical engagement with either of the contacts.

The running winding 13 is electrically connected to the power line 16 through the bimetal element 21 and a variable resistor 29, the running winding 13 and the bimetal element 21 and the variable resistor 29 thus being connected in series across the two power lines 16 and 17. The starting winding 14 is also connected across the two power lines 16 and 17 when the movable contacts 24 of the relay make engagement with the stationary contact 22.

The apparatus further includes a P-N junction diode 31 connected in parallel with the bimetal element 21 and the variable resistor 29, the purpose of which will be explained hereinafter.

Neglecting for the time being the effect of the diode 31, the operation of the circuit shown in FIG. 1 is as follows: Before the power lines 16 and 17 are connected to a suitable alternating current single phase power supply, the bimetal element 21 is relatively cool, probably at ambient temperature, and the movable contact 24 is in engagement with the stationary contact 22, which is the normal condition of the relay 19. When the power lines 16 and 17 are connected to the AC power supply, current flows through the running and starting windings 13 and 14, and the magnitude of the currents is relatively high during startup conditions. The current passing through the running winding 13 flows from the power line 16, through the variable resistor 29, the bimetal element 21, and the running winding 13 to the other power line 17. The current path for the starting winding 14 is from the power line 16 through the movable contact 24, the stationary contact 22, and the starting winding 14 to the other power line 17. Due to the relatively heavy current flowing through the bimetal element 21 and the running winding 13, the bimetal element 21 heats up relatively rapidly and deflects sufficiently to move the movable contact 24 out of engagement with the stationary contact 22. This condition of the circuit is shown in FIG. 2, and it will be apparent that the starting winding 14 is deenergized. The motor 11 will then come up to speed and operate on the running winding 13, the starting winding 14 normally being maintained out of circuit. If, during operation, the running load current is high enough, its flow through the bimetal element 21 will cause the bimetal element to deflect still further and make electrical engagement with the other stationary contact 23, as shown in FIG. 3. The running winding 13 is then connected directly to the power line 16 through the movable contact 24 shunting or bypassing the variable resistor 29 and the bimetal element 21. Since no current then flows through the bimetal element 21, it cools somewhat and moves the movable contact 24 to the position shown in FIG. 2. Thus, during normal running conditions, the bimetal element 21 cyclically makes and breaks the shunt path around it through the movable contact 24 and thereby maintains the temperature of the bimetal element 21 within a limited range which is sufficient to hold the movable contact 24 out of electrical engagement with the stationary contact 22.

As was described previously, and particularly in the event the motor 11 starts up under a relatively heavy load, relatively large currents will flow through the main winding and the starting winding during starting and this current will heat up the thermal element 21 relatively rapidly, raising the possibility that the movable contact 24 will disconnect the starting winding 14 before the motor 11 has come up to speed. If the thermal relay 19 were constructed with a sufficiently low electrical resistance to prevent the foregoing from occurring, there is also the possibility, as previously described, that the bimetals element 21 may not maintain the movable contact 24 out of engagement with the stationary contact 22 under relatively light load running conditions due to the fact that the relatively small amount of current flowing through the bimetal element 21 and the running winding 13 may not be sufficient to heat the bimetal element 21 and deflect it to hold the movable contact 24 in the intermediate position shown in FIG. 2.

To eliminate the foregoing difficulties, the diode 31 connected in parallel with the bimetal element 21 and the variable resistor 29 are arranged to shunt a relatively large proportion of the current around the resistor 29 and the bimetal element 21 during heavy current flow operating conditions and also to conduct relatively little or no current during light load running conditions. The amount of current flowing through the diode 31 depends upon the forward bias voltage across it, which in turn is dependent upon the amount of current flowing through the variable resistor 29 and the bimetal element 21, the forward bias voltage across the diode 31 being equal to the voltage drop across the resistor 29 and the bimetal element 21. In a specific example, the conduction characteristics of the current $i$ through a forward-biased P-N junction diode are defined approximately by the equation $$i = i_0 \epsilon A V$$

where:

$i_0$ equals the saturation reverse current of the particular ular junction diode employed (which is relatively small), V equals the voltage across the junction, A equals the constant (at a given temperature) of the theoretical value $e/kT$ where $e$ equals the electron charge, $k$ equals Boltzmann's constant, and T equals the absolute temperature of the junction.

At 300° K., A is approximately 39, and consequently the current flowing through the junction diode increases by a factor of approximately 50 for each 0.1 volt increase in the voltage across the diode. If the voltage drop across the resistor 29 and the bimetal element 21 is approximately 0.5 volt peak during running conditions and increases to 0.7 volt peak during startup conditions, a diode which conducts 0.01 ampere at a forward bias voltage of 0.5 volt, which corresponds to a peak value of 6 amperes through the bimetal element 21 during running conditions, will also conduct approximately 25 amperes peak when the voltage across the diode rises to 0.7 volt during startup conditions. The bimetal current will then be approximately 8.5 amperes peak during startup conditions resulting in a startup current through the main or running winding 13 of 33 amperes peak.

From the foregoing it will be apparent that whereas the current flowing through the running winding 13 is 6 amperes peak during running conditions and 33 amperes peak during startup conditions, the current through the bimetal element 21 is 6 amperes peak during running conditions and only 8.5 amperes peak during starting conditions, the difference of course being shunted through the diode 31. Consequently, the thermal relay 19 may be constructed with a low thermal capacity, and a relatively high electrical resistance, and therefore meet all of the operating conditions described previously.

Figure 4:
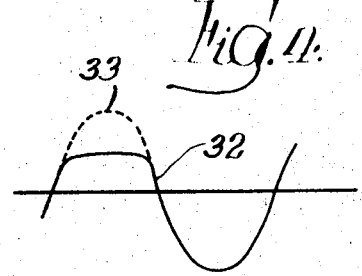
FIG. 4 shows a curve illustrating the operation of the circuit shown in FIGS. 1 to 3.

The wave form shown in FIG. 4 represents current through the bimetal element 21, the solid line portion 32 of the curve representing the current flowing through the bimetal element 21 when the diode 31 is present and the dotted line portion 33 of the curve representing the portion of the current which is clipped off or bypassed by diode 31. Since the diode 31 conducts appreciable current in only one direction, only one peak of the current will be shunted around the bimetal element 31. A portion of one polarity of the bimetal element current is therefore shunted while there is not effect on the other polarity of the bimetal element current. The variable resistor 29 is preferably provided so that the voltage drop across the diode 31 may be adjusted.

Figure 5:
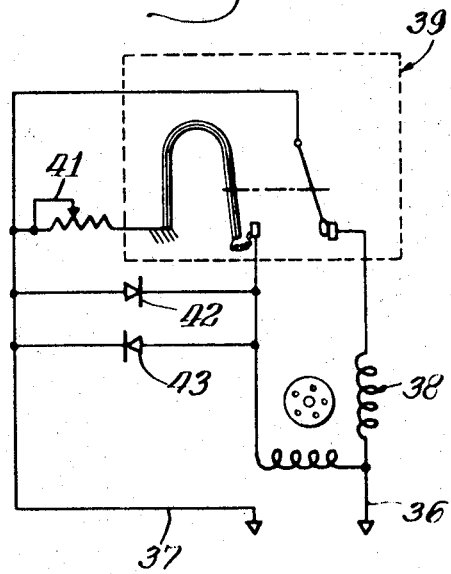
FIG. 5 is a schematic illustration generally similar to FIG. 1 but showing an alternative form of the invention.
Figure 6:
FIG. 6 shows a curve generally similar to FIG. 4, illustrating the operation of the circuit shown in FIG. 5.

In the event it is necessary to shunt more current around the bimetal element of the thermal relay than is possible with the circuit shown in FIGS. 1 to 3, a circuit may be designed to clip both polarities of the current, which may be accomplished using the circuit shown in FIG. 5. The circuit shown in FIG. 5 includes two power lines 36 and 37, a motor 38, a thermal relay 39 and a variable resistor 41, the foregoing elements being substantially the same as the corresponding elements shown in FIGS. 1 to 3. Connected in parallel with the variable resistor 41 and the bimetal element of the thermal relay 39 are two P-N junction diodes 42 and 43, each of these diodes being connected in parallel with the variable resistor 41 and the thermal element, but being connected to conduct current in opposite directions. The two diodes 42 and 43 may be identical and have substantially the same operating characteristics as the diode 31 shown in the FIGS. 1 to 3. FIG. 6 is a wave form showing the current flowing through the bimetal element of the relay 39, and since the two diodes 42 and 43 are oppositely connected, they will conduct currents in opposite directions during opposite polarities of the voltage across the variable resistor 41 and the bimetal element, resulting in a clipping of both polarities of the bimetal current. Thus, the circuit shown in FIG. 5 will shunt approximately twice the amount of current as the circuit shown in FIGS. 1 to 3.

Figure 7:
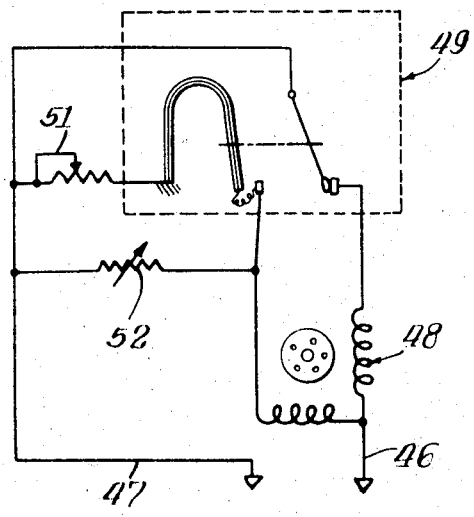
FIG. 7 shows a schematic illustration of another embodiment of the invention, generally similar to FIG. 1.

FIG. 7 shows another circuit which operates generally similarly to the circuit shown in FIG. 5, but, instead of diodes 42 and 43, it includes a nonlinear resistance element having operating characteristics such that, above a critical voltage, the resistance of the element drops sharply. Such an element may be a thyrite element of a material similar to that employed in lightning arresters. The circuit shown in FIG. 7 includes two power lines 46 and 47, a motor 48, a thermal relay 49, a variable resistor 51 and a nonlinear resistance element 52 having the properties described above. The amount of current flowing through the element 52 is nonlinearly related to the voltage drop across it, the current increasing much more rapidly than the voltage drop. It is not polarity dependent, as is a P-N junction diode of the type previously described, and, consequently, it results in a current flow through the bimetal element of the relay 49 similar to the current flow in the circuit shown in FIGS. 5 and 6. Again, the construction of the element 52 should be chosen such that a relatively small percentage of the running winding current flows through the element 52 at the voltage drop developed across the variable resistor 51 and the thermal relay element 49 during light load running conditions, but a substantial proportion of the running winding current will flow through the element 52 at a somewhat higher voltage which is developed during the startup conditions while the starting winding of the motor 48 is energized.

Figure 8:
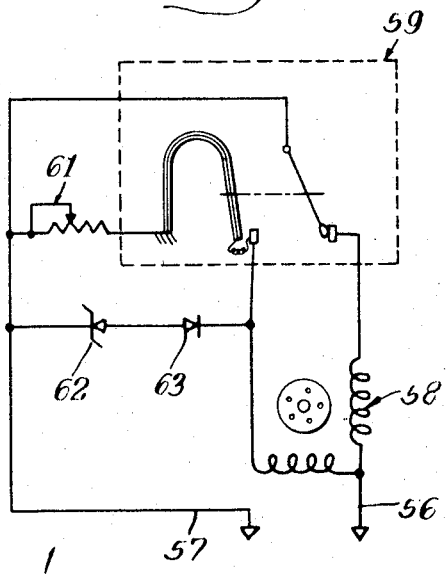
FIG. 8 is a schematic illustration generally similar to FIG. 1 showing still another form of the invention.

FIG. 8 shows a circuit which operates generally similarly to the circuit shown in FIGS. 1 to 4, and comprises two power lines 56 and 57, an electric motor 58, a thermal relay 59, a variable resistor 61 connected in series with the bimetal element of thermal relay 59, a Zener diode 62 and a P-N junction diode 63. The Zener diode 62 and the P-N junction diode 63 are connected in series across the series connection of the variable resistor 61 and the bimetal element of the thermal relay 59.

A Zener diode is also P-N junction but with a relatively thin and controlled junction width. In the forward bias direction, the current carrying or conduction characteristics of the Zener diode are not unlike the corresponding characteristics of the P-N junction diode shown in FIGS. 1 and 5, but due to the P-N junction diode 63 connected in series with the Zener diode 62, current cannot flow through the Zener diode 62 in the forward direction. It should be noted that the forward direction of the Zener diode is opposite that of the P-N junction diode 63. The P-N junction diode 63 however does not prevent current flow through the Zener diode 62 in the reverse direction of the Zener diode, and, thus, at the Zener voltage across the Zener diode the current increases very rapidly from relatively low current to a relatively high current at voltages in excess of the Zener voltage. Consequently, in the operation of the circuit shown in FIG. 8, the diode 63 will prevent current of one polarity from flowing through the shunt branch around the bimetal element whereas, during the other polarity, the Zener diode 62 will prevent current flow through the shunt branch until the voltage drop across the variable resistor 61 and the bimetal element reaches a predetermined Zener voltage and thereafter the shunt branch will provide a relatively low resistance shunt path around the bimetal element, resulting in a current wave form similar to that shown in FIG. 4.

For Zener diodes with Zener voltages less than about five volts, which are those contemplated in the operation of this invention, this Zener voltage is due to the quantum effect known as tunneling. Because the Zener voltage, at which reverse bias conduction begins to be appreciable, is higher than the forward bias junction of a P-N junction for a similar current conduction, the circuits of FIGS. 8 and 9 would be employed where the bimetal element voltage drop during running conditions is too high to employ the circuits shown in FIGS. 1 and 5. Zener diodes may be obtained with virtually any value of Zener voltage required to match the bimetal element.

Figure 9:
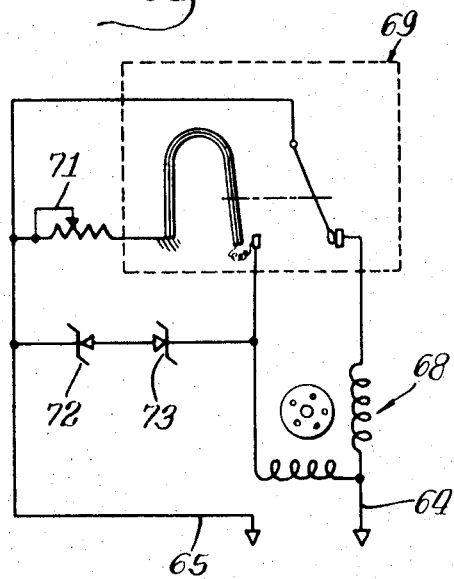
FIG. 9 is a schematic illustration generally similar to FIG. 1, showing still another form of the invention.

The circuit shown schematically in FIG. 9 operates similar to the circuit shown in FIG. 5 and comprises two power lines 64 and 65, a motor 68, a thermal relay 69, and a variable resistor 71 connected in series with the bimetal element of the thermal relay 69, the foregoing elements being generally similar to the corresponding elements of the previously described circuits. Shunted around the variable resistor 71 and the bimetal element of the relay 69 are two series connected Zener diodes 72 and 73, the two Zener diodes being connected in back-to-back or in reverse polarity directions.

In the operation of the circuit shown in FIG. 9 the Zener diode 72 will conduct current of one polarity after the Zener voltage of that polarity has been reached while the other Zener diode 73 will conduct current in the opposite direction when the voltage of the other polarity has reached the Zener voltage. If the Zener voltages of the two diodes 72 and 73 are substantially equal, the wave form for current through the bimetal element of the relay 39 will be similar to that shown in FIG. 6.

Figure 10:
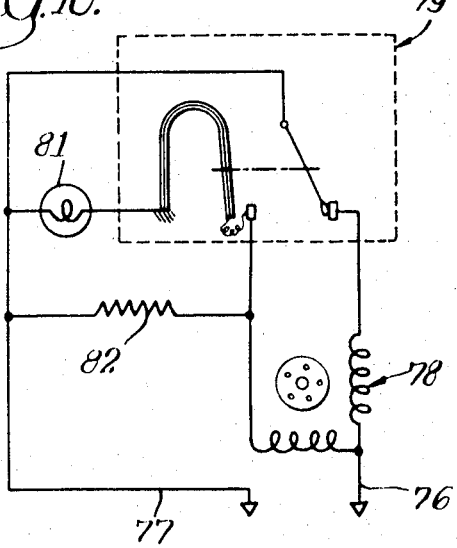
FIG. 10 is a schematic illustration generally similar to FIG. 1, showing still another form of the invention.

The circuit shown in FIG. 10 also includes two power lines 76 and 77, a motor 78, and a thermal relay 79, which are similar to the corresponding elements of previously described circuits. However, instead of a variable resistor, a non-linear resistance element 81 is connected in series with the bimetal element of the thermal relay 79, and a fixed resistor 82 is connected in parallel with the series connection of the element 81 and the thermal element of the relay 79. The non-linear resistant element 81 may be a filament of a refractory metal such as tungsten or molybdenum having a characteristic such that current conduction through it increases at a faster rate than the voltage across its terminals. When a filament of a refractory metal is employed, it should of course be protected from oxidization at incandescent temperatures. The nonlinear voltage-current characteristic of the element 81 is related to its temperature coefficient of resistance. The fixed resistor 82 limits the voltage magnitude that can be developed across the series connected combination of the bimetal element and the non-linear element 81.

The characteristics of the nonlinear element 81, the bimetal element of the relay 79 and the fixed resistor 82 are chosen such that during light load running conditions, the total resistance of the element 81, the bimetal element of the relay 79 and the resistor 82 is such that the contacts of the relay 79 are maintained open. However, during starting conditions when the starting winding of the motor 78 is energized, a greater proportion of the total current is shunted through the fixed resistor 82 because of the increased resistance of the nonlinear element 81 and the relatively high current, and consequently temperature, existing during start-up conditions. The overall effect of the nonlinear element 81 and the resistor 82 is to increase the opening delay time of the contacts for the starting winding, as is the case with the other circuits described.

The circuits shown in FIGS. 1 and 5 are advantageous because of their relatively low cost. The circuit shown in FIG. 6, on the other hand, is advantageous because it is adaptable to a wide range of bimetal element resistances. While the circuits shown in FIG. 8 and 9 are more expensive than the circuits shown in FIGS. 1 and 5, they are advantageous where the voltage developed across the bimetal element is too high during run conditions for the forward-bias characteristic of a P-N junction device. It should be kept in mind, of course, that a number of P-N junction diodes could be connected in series to increase, in steps, the total forward bias voltage at which the series combination of the diodes shunts appreciable current. Therefore, a series connection of a number of P-N junction diodes could produce the same result as a single Zener diode, and costs considerations may determine the choice between them.

It will be apparent from the foregoing that novel and useful apparatus has been provided for disconnecting the starting winding of an AC single phase induction motor after the motor has come up to a predetermined percentage of running speed. Due to the provision of means for shunting a portion of the current around the bimetal element of the thermal relay during high current flow starting conditions, the bimetal element of the thermal relay does not heat up too quickly and prematurely disconnect the starting winding before the motor has come up to speed. In addition, since the shunting means also causes practically all of the running winding current to flow through the bimetal element during normal running conditions, the bimetal element is sufficiently heated to maintain the starting winding out of the power circuit.

I claim:

1. An electric motor comprising starting and running windings adapted to be energized by two alternating current carrying power lines, one side of both of said motor windings being electrically connected together and being adapted to be connected to one of said power lines, a thermal relay including an electrically conductive movable thermal element, a stationary relay contact and a movable relay contact, said movable relay contact being selectively actuatable by said thermal element to a first position where it engages said stationary contact and to a second position where it is out of engagement with said stationary contact, said movable contact and one side of said thermal element being adapted to be connected to the other of said power lines, the other side of said thermal element being connected to the other side of said running winding, and said stationary contact being connected to the other side of said starting winding, and means connected to said thermal element for shunting only a portion of the current flowing through said running winding around said thermal element during high current flow operating conditions and causing substantially all of the current flowing through said running winding to flow through said thermal element during relatively low current flow operating conditions.

2. Apparatus as in claim 1, wherein said shunting means comprises voltage responsive means responsive to the voltage drop across said thermal element of said relay, said shunting means providing a relatively low resistance shunt path around said thermal element when the voltage drop across the thermal element is relatively high and providing a relatively high resistance shunt path around said thermal element when the voltage drop across said bimetal element is relatively low.

3. Apparatus as in claim 1, and further including a resistor connected in series with said bimetal element of said thermal relay.

4. An electric motor comprising starting and running windings adapted to be energized by two alternating current carrying power lines, one side of both of said motor wingings being electrically connected together and being adapted to be connected to one of said power lines, thermal relay including an electrically conductive movable thermal element, a stationary relay contract and a movable relay contact, said movable relay contact being selectively actuatable by said thermal element to a first position where it engages said stationary contact and to a second position where it is out of engagement with said stationary contact, said movable contact and one side of said thermal element being adapted to be connected to the other of said power lines, the other side of said thermal element being connected to the other side of said running winding, and said stationary contact being connected to the other side of said starting winding, and means connected to said thermal element for shunting a portion of the current flowing through said running winding around said thermal element during high current flow operating conditions and causing substantially all of the current flowing through said running winding to flow through said thermal element during relatively low current flow operating conditions, said shunting means being responsive to the voltage drop across said thermal element of said relay, said shunting means providing a relatively low resistance shunt path around said thermal element when the voltage drop across the thermal element is relatively high and providing a relatively high resistance shunt path around said thermal element when the voltage drop across said bimetal element is relatively low, said shunting means comprising a P-N junction diode connected in parallel with said thermal element of said relay.

5. Apparatus as in claim 4, and further including a second P-N junction diode connected in parallel with said thermal element, and two P-N junction diodes being connected to conduct current in opposite directions.

6. An electric motor comprising starting and running windings adapted to be energized by two alternating current carrying power lines, one side of both of said motor windings being electrically connected together and being adapted to be connected to one of said power lines, a thermal relay including an electrically conductive movable thermal element, a stationary relay contact and a movable relay contract, said movable relay contact being selectively actuatable by said thermal element to a first position where it engages said stationary contact and to a second position where it is out of engagement with said stationary contact, said movable contact and one side of said thermal element being adapted to be connected to the other of said power lines, the other side of said thermal element being connected to the other side of said running winding, and said stationary contact being connected to the other side of said starting winding, and means connected to said thermal element for shunting a portion of the current flowing through said running winding around said thermal element during high current flow operating conditions and causing substantially all of the current flowing through said running winding to flow through said thermal element during relatively low current flow operating conditions, said shunting means being responsive to the voltage drop across said thermal element of said relay, and shunting means providing a relatively low resistance shunt path around said thermal element when the voltage drop across the thermal element is relatively high and providing a relatively high resistance shunt path around said thermal element when the voltage drop across said bimetal element is relatively low, said shunting means comprising a nonlinear resistance element connected in parallel with said thermal element.

7. Apparatus as in claim 6, wherein said nonlinear resistance element decreases in resistance as the voltage drop across it increases.

8. An electric motor comprising starting and running windings adapted to be energized by two alternating current carrying power lines, one side of both of said motor windings being electrically connected together and being adapted to be connected to one of said power lines, a thermal relay including an electrically conductive movable thermal element, a stationary relay contact and a movable relay contact, said movable relay contact being selectively actuatable by said thermal element to a first position where it engages said stationary contact and to a second position where it is out of engagement with said stationary contact, said movable contact and one side of said thermal element being adapted to be connected to the other of said power lines, the other side of said thermal element being connected to the other side of said running winding, and said stationary contact being connected to the other side of said starting winding, and means connected to said thermal element for shunting a portion of the current flowing through said running winding around said thermal element during high current flow operating conditions and causing substantially all of the current flowing through said running winding to flow through said thermal element during relatively low current flow operating conditions, said shunting means being responsive to the voltage drop across said thermal element of said relay, said shunting means providing a relatively low resistance shunt path around said thermal element when the voltage drop across the thermal element is relatively high and providing a relatively high resistance shunt path around said thermal element when the voltage drop across said bimetal element is relatively low, said shunting means comprising a Zener diode and a P-N junction diode connected in series and with reverse bias, said Zener diode and said P-N junction diode being connected in parallel with said thermal element of said relay.

9. An electric motor comprising starting and running windings adapted to be energized by two alternating current carrying power lines, one side of both of said motor windings being electrically connected together and being adapted to be connected to one of said power lines, a thermal relay including an electrically conductive movable thermal element, a stationary relay contact and a movable relay contact, said movable relay contact being selectively actuatable by said thermal element to a first position where it engages said stationary contact and to a second position where it is out of engagement with said stationary contact, said movable contact and one side of said thermal element being adapted to be connected to the other of said power lines, the other side of said thermal element being connected to the other side of said running winding, and said stationary contact being connected to the other side of said starting winding, and means connected to said thermal element for shunting a portion of the current flowing through said running winding around said thermal element during high current flow operating conditions and causing substantially all of the current flowing through said running winding to flow through said thermal element during relatively low current flow operating conditions, said shunting means being responsive to the voltage drop across said thermal element of said relay, said shunting means providing a relatively low resistence shunt path around said thermal element when the voltage drop across the thermal element is relatively high and providing a relatively high resistance shunt path around said thermal element when the voltage drop across said bimetal element is relatively low, said shunting means comprising two Zener diodes serially connected in back-to-back relation in parallel with said thermal element of said relay.

10. An electric motor comprising starting and running windings adapted to be energized by two alternating current carrying power lines, one side of both of said motor windings being electrically connected together and being adapted to be connected to one of said power lines, a thermal relay including an electrically conductive movable thermal element, a stationary relay contact and a movable relay contact, said movable relay contact being selectively actuatable by said thermal element to a first position where it engages said stationary contact and to a second position where it is out of engagement with said stationary contact, said movable contact and one side of said thermal element being adapted to be connected to the other of said power lines, the other side of said thermal element being connected to the other side of said running winding, and said stationary contact being connected to the other side of said starting winding, and means connected to said thermal element for shunting a portion of the current flowing through said running winding around said thermal element during high current flow operating conditions and causing substantially all of the current flowing through said running winding to flow through said thermal element during relatively low current flow operating conditions, said shunting means being responsive to the voltage drop across said thermal element of said relay, said shunting means providing a relatively low resistance shunt path around said thermal element when the voltage drop across the thermal element is relatively high and providing a relatively high resistance shunt path around said thermal element when the voltage drop across said bimetal element is relatively low, said shunting means comprising a nonlinear resistance element connected in series with said thermal element of said relay, and a fixed resistor connected in parallel with said nonlinear resistance and said thermal element of said relay, said nonlinear resistance decreasing in resistance with increased voltage drop across it.

11. Apparatus as in claim 10, wherein said nonlinear resistance comprises a filament of refractory material.

12. An electric motor comprising starting and running windings adapted to be energized by two alternating current carrying power lines, one side of both of said windings being electrically connected together and being adapted to be connected to one of said power lines, a thermal relay including an electrically conductive movable thermal element, first and second stationary relay contacts, and a movable element, said thermal element being selectively actuatable by said thermal element to a first position where it engages said first stationary contact, to a second position where it engages said second stationary contact and to a third position where it is out of engagement with both said first and said second stationary contacts, said movable contact and one side of said thermal element being adapted to be connected to the other of said power lines, and second stationary contact and the other side of said thermal element being connected to the other side of said running winding, said first stationary contact being connected to the other side of said starting winding, and means connected to said thermal element for shunting only a portion of the current normally flowing through said thermal element around said thermal element during high current flow operating conditions.

References Cited

UNITED STATES PATENTS

| | | | |
|---|---|---|---|
| 2,175,032 | 10/1939 | Schaefer | 318—221 |
| 2,874,344 | 2/1959 | Slocum | 318—221 |
| 3,112,384 | 11/1963 | Bodge | 318—221 XR |
| 3,213,239 | 10/1965 | Bodge | 318—221 XR |

ORIS L. RADER, Primary Examiner

G. Z. RUBINSON, Assistant Examiner

U.S. Cl. X.R.

317—13